United States Patent [19]

Sherlock

[11] 4,138,803
[45] Feb. 13, 1979

[54] FLOWER POT CONSTRUCTION

[75] Inventor: Hugh P. Sherlock, Palo Alto, Calif.

[73] Assignee: M.U. Engineering & Manufacturing Inc., Mountain View, Calif.

[21] Appl. No.: 785,314

[22] Filed: Apr. 6, 1977

[51] Int. Cl.$^2$ ............................................. A01G 27/00
[52] U.S. Cl. ......................................... 47/67; 47/81
[58] Field of Search ................... 47/66, 67, 68, 70, 79, 47/80, 81, 58, 82, 83; 24/73 P, 73 S, 73 BC, 73 B, 101, 201 A; 220/268–271; 215/205, 211, 224, 296

[56] References Cited

U.S. PATENT DOCUMENTS

| 124,207 | 3/1872 | Hess | 47/81 |
|---|---|---|---|
| 665,502 | 1/1901 | Boggs | 47/80 |
| 670,358 | 3/1901 | Finley | 215/296 |
| 2,605,588 | 8/1952 | Lindstaedt | 47/67 |
| 3,149,385 | 9/1964 | Beekenkamp | 24/101 R |
| 3,455,055 | 7/1969 | Chute | 47/81 |
| 3,739,524 | 6/1973 | Rose | 47/81 |
| 3,785,088 | 1/1974 | Guarriello | 47/66 |
| 3,803,670 | 4/1974 | Johnson | 24/73 P |
| 3,943,661 | 3/1976 | Devito et al. | 47/67 |
| 3,949,524 | 4/1976 | Mickelson | 47/79 |
| 3,990,179 | 11/1976 | Johnson et al. | 47/58 |

FOREIGN PATENT DOCUMENTS

| 353617 | 9/1905 | France | 220/270 |
|---|---|---|---|
| 2221354 | 10/1974 | France | 215/296 |
| 937220 | 9/1963 | United Kingdom | 24/73 AP |

*Primary Examiner*—Edgar S. Burr
*Assistant Examiner*—James R. Feyrer
*Attorney, Agent, or Firm*—Flehr, Hohbach, Test, Albritton & Herbert

[57] ABSTRACT

Flower pot construction having a container formed of plastic, said container having a bottom wall and outwardly and upwardly extending generally frusto-conical side wall. A rim is formed integral with the upper extremity of the side wall and this is substantially in the form of an inverted U defining an annular recess underlying the rim. The bottom wall has a hole therein. A removable plug is disposed in the hole and forms a water-tight seal with respect to the hole. A disc-like member having drain openings therein is provided. Cooperative means is carried by the disc-like member in the container so that it is spaced above the bottom wall of the container.

2 Claims, 6 Drawing Figures

U.S. Patent  Feb. 13, 1979  4,138,803
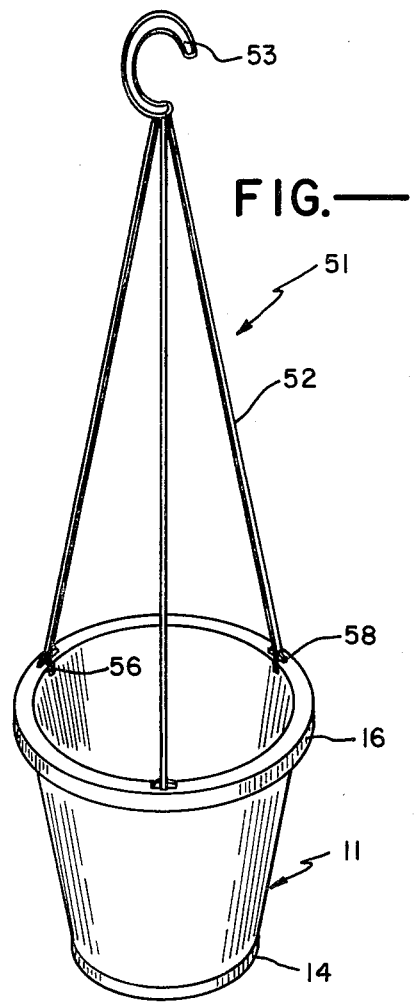
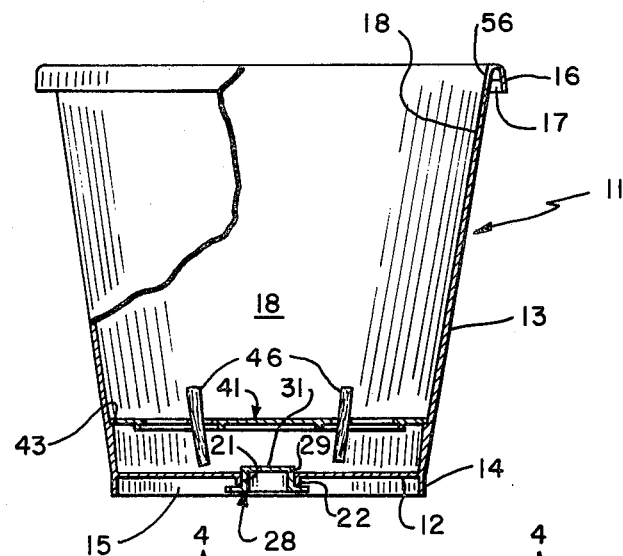
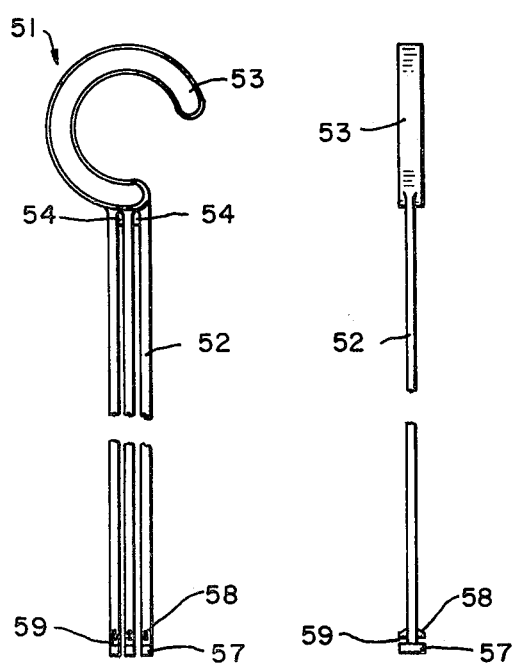
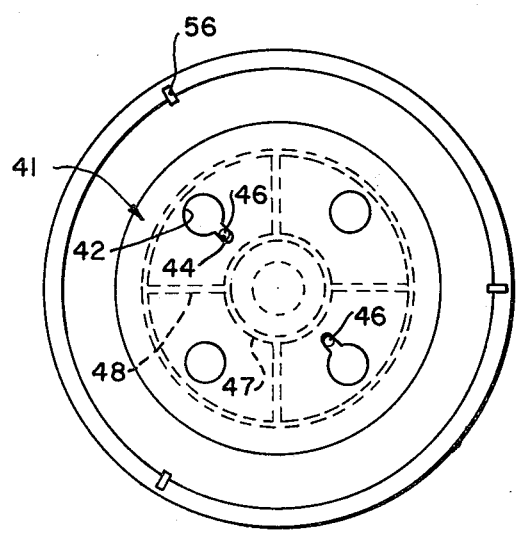
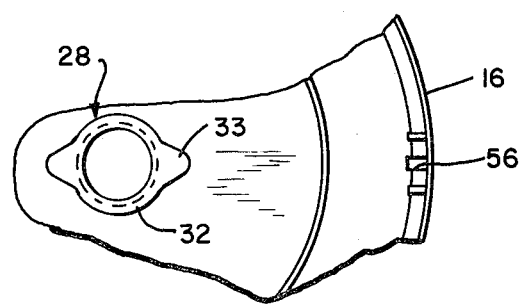
FIG.—1
FIG.—2
FIG.—3
FIG.—4
FIG.—5
FIG.—6

FLOWER POT CONSTRUCTION

BACKGROUND OF THE INVENTION

Many different types of flower pot constructions have heretofore been provided. However, the constructions of the same have not lent themselves to being made of plastic. In addition, previous flower pots have been relatively heavy and difficult to ship from one place to another, particularly with plants therein. There is, therefore, a need for a new and improved flower pot construction.

OBJECTS AND SUMMARY OF THE INVENTION

The flower pot construction consists of a container formed of plastic. The container has a bottom wall and an outwardly inclined generally frusto-conical side wall. A rim is formed integral with the upper extremity of the side wall and is substantially in the form of an inverted U defining an annular recess underlying the rim. The bottom wall has a hole therein. A removable plug is disposed in the hole and forms a water-tight seal with respect to the hole. A disc-like member having a drain opening therein is provided. Cooperative means is carried by the disc-like member and the side wall for supporting the disc-like member in the container so that it is spaced above the bottom wall. A hanger is provided which comprises three elongated elements with cooperative means for securing the elongated elements to the rim.

In general, it is an object of the invention to provide a flower pot construction which can be readily formed of plastic.

Another object of the invention is to provide a construction of the above character in which a multi-functional rim is provided which makes it possible to utilize less plastic in the walls of the flower pot.

Another object of the invention is to provide a construction of the above character in which the rim serves to conceal the means for attaching a hanger utilized for suspending the flower pot.

Another object of the invention is to provide a construction of the above character in which a secondary bottom wall is provided for supporting the soil above the bottom wall of the flower pot to provide a reservoir for water and an air space.

Another object of the invention is to provide a construction of the above character in which the bottom wall has been provided with an opening which can be closed by a closure so that the bottom wall can be water-tight.

Another object of the invention is to provide a construction of the above character which can be nested and shipped from one location to another.

Another object of the invention is to provide a construction of the above character in which plants can be shipped and in which a reservoir of water can be provided.

Additional objects and features of the invention will appear from the following description in which the preferred embodiment as set forth in detail in conjunction with the accompanying drawings.

BRIEF DESCRIPTION OF THE DRAWINGS

FIG. 1 is an isometric view of a flower pot construction incorporating the present invention.

FIG. 2 is a side elevational view of the flower pot construction shown in FIG. 1 with certain portions broken away and with the hanger removed.

FIG. 3 is a top plan view of the flower pot construction shown in FIG. 2.

FIG. 4 is a partial bottom plan view of the flower pot construction shown in FIG. 2.

FIG. 5 is a front elevational view of the hanger used in connection with the flower pot construction shown in FIG. 1.

FIG. 6 is a side elevational view of the hanger shown in FIG. 5.

DESCRIPTION OF THE PREFERRED EMBODIMENT

The flower pot construction, as shown in FIGS. 1 through 6, consists of container 11. Container 11 is formed of a suitable plastic such as polypropylene or high impact styrene. As shown in the drawings, the container consists of a planar circular bottom wall 12 and an outwardly extending generally frusto-conical side wall 13 formed integral therewith. A generally cylindrical downwardly extending lip or flange 14 is formed integral with the side wall 13 and extends below the bottom wall 12 to define a cylindrical recess 15. A rim 16 is formed integral with the upper extremity of the side wall 13 and is substantially in the form of an inverted U defining an annular recess 17 underlying the rim. The upper end of the container is open as shown to give access to a soil and plant receiving space 18 provided within the container.

The bottom wall 12 is provided with the centrally disposed hole 21. The bottom wall 12 is provided with an inwardly and downwardly inclined frusto-conical lip 22. A plug 28 is provided for closing the hole 21 to form a liquid-tight seal and consists of a frusto-conical wall 29 which has a size which can fit within the hole 21 and seat in the frusto-conical lip 22. The plug is also provided with a top wall 31 formed integral with the upper extremity of the wall 29. The plug 28 is also provided with an annular flange 32 on its lower extremity which is formed integral with the wall 29 and which extends outwardly from the wall. A pair of ears 33 are formed on flange 32 on opposite sides to facilitate insertion and removal of the plug.

A disc-like plate or member 41 is provided for use with the container 11. It is generally circular, as shown, and is provided with a plurality of openings 42, namely four spaced 90° apart which will serve as drain openings as hereinafter described. Cooperative means is carried by the disc or plate 41 and the container 11 to support the plate 41 at a position which is spaced above the bottom wall 12. The cooperative means consists of a small annular step 43 provided on the inner surface of the side wall 13. The step 43 is such that the disc or plate 41 can rest upon the same and be supported thereby above the bottom wall 12. Two slots 44 are also provided in the plate 41 and open into two of the openings 42. The slots 44 carry wicks 46 for a purpose hereinafter described. A circular reinforcing rib 47 and radially extending reinforcing ribs 48 are provided on the bottom side of the plate 41 as shown in FIGS. 2 and 3.

A hanger 51 is provided for supporting the container 11 so that a hanging flower pot can be provided. Hanger 51 consists of at least three elongate elements 52 formed of a suitable material such as plastic. One plastic found to be satisfactory is polypropylene. At one end of each of the elements is secured to a suitable support as, for example, a hook 53 which can be formed integral with one end of each of the elongate elements 52. It should be appreciated that any other suitable support means such as an eye or the like can be provided in place of the hook. Reinforcing gussets 54 which are substantially thinner than the elements 52 are provided for reinforcing the connection between the hook 53 and the elements 52.

Cooperative means is provided for securing the lower extremities of the elements 52 to the rim 16 and, as shown, consists of slots 56 spaced 120° apart which are formed on the rim 16. Locking means is provided on the other end of the elongate elements 52 adapted to engage with the slots 56 in the rim and consists of a mallet head member 57 which has a box-like configuration that is formed integral with the lower extremities of the elongate elements 52. A pair of fins or gussets 58 are provided on opposite sides of elongate element 52 adjacent to but spaced from the mallet heads 57 to provide spaces 59 therebetween.

In use it can be seen that the hanger 51 can be secured to the rim 16 by inserting the lower extremities of the elongate elements 52 into the slots in such a manner so that the mallet heads 57 are disposed in the recess 17 beneath the rim and so that the fins or gussets 58 overlie the top of the rim to lock the lower extremities of elongate elements 52 to the rim. The mallet head, since it is disposed within the recess 17, will be hidden from view. In inserting the mallet head into the recess, it is necessary to rotate the lower extremity of the elongate elements 52. Since the mallet head is provided with two restraining surfaces, it is capable of readily withstanding shear loads.

It is believed that the operation and use of the flower pot construction can be readily understood by examining the construction herein shown. The flower pot, because it uses a straight taper except for the rim, and the bottom cylindrical portion, has a pleasing appearance to the eye. The rim which is utilized is multi-functional. As pointed out previously, it serves to stiffen the pot and thereby reduces the amount of plastic which is required to be utilized in the walls to obtain the necessary stiffness for the side wall. The rim also provides means whereby it is possible to substantially conceal the means utilized for attaching the hanger to the rim.

The construction of the bottom wall is such that when the plug is inserted therein, the bottom wall is water-tight and will not drip water. When the bottom is sealed, the space provided between the plate 41 which serves as a secondary bottom can be utilized for storing water for the plant which is planted in the soil carried above the plate the space 18. This makes it possible to use the flower pot for shipping purposes for periods as great as ten days or more. The space between the secondary bottom formed by the disc or plate 41 and the bottom wall 12 also provides an air space which prevents the roots from becoming soggy with water. The wicks 46 which extend into the water and into the soil ensure that the water which is carried below the secondary bottom is supplied to the soil for use by the plant. Since the plug 28 is removable, water can be drained from the flower pot if and when desired.

It also should be appreciated that the plug can be removed and the pot used in a conventional manner. That is, it can be placed in a saucer to collect water which drains from the soil in the pot.

By utilization of the hanger 51, it can be seen that the pot can be readily suspended from any desired location. The hanger utilized has a pleasing appearance and blends with the construction of the pot. The hanger is locked onto the pot and cannot be accidentally dislodged.

What is claimed is:

1. In a flower pot construction, a container formed of plastic, said container having a bottom wall and an outwardly extending generally frusto-conical side wall formed integral with the bottom wall, a rim formed integral with the upper extremity of the side wall and being substantially in the form of an inverted U defining an annular recess underlying the rim, said bottom wall having a hole therein and being formed with a downwardly extending frusto-conical lip extending downwardly from said hole, a removable plug formed with a frusto-conical side wall disposed in said hole and adapted to engage said lip to form a water-tight seal, a disc-like member having drain openings therein, cooperative means carried by the disc-like member and said side wall for supporting the disc-like member in the container so that it is spaced above the bottom wall and can carry plant soil, a hanger for supporting said flower pot in a suspended position, said hanger including at least three flexible elongate elements and cooperative means carried by the flexible elongate elements and the rim for securing the flexible elongate elements to the rim to support the container, said cooperative means including spaced apart slots formed in the rim and extending downwardly into said side wall, mallet-like members carried by said elongate elements inserted through said slots and having portions thereof engaging the underside of said rim to support said container from said hanger, fins carried by said elongate elements overlying said mallet-like members and engaging the upper side of said rim to retain said mallet-like members in engagement with said rim, and a wick carried by said disc-like member and adapted to extend into water carried by the container and into the soil carried by the disc-like member, said plate having a slot therein opening into one of said drain openings to form a keyhole opening, said wick being retained in said slot.

2. A construction as in claim 1 wherein said plug is provided with laterally extending ears serving as means to facilitate insertion of the plug into said hole and removal of said plug from said hole.

* * * * *